Nov. 22, 1966  A. R. HESS ET AL  3,287,200
METHOD OF STRENGTHENING GLASS BY ION
EXCHANGE AND ARTICLES THEREFROM
Filed Oct. 4, 1962
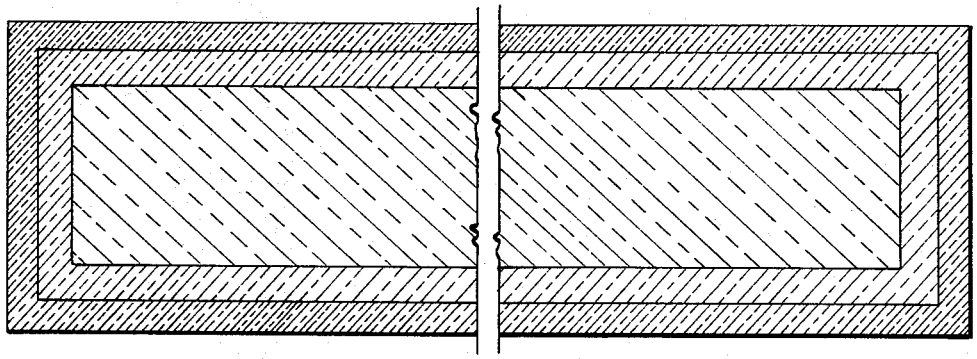
 = COMPRESSION DUE TO SUBSEQUENT ION EXCHANGE STEP.
 = COMPRESSION DUE TO INITIAL STRENGTHENING STEP.
 = TENSION
INVENTORS
ALBERT R. HESS
BY GEORGE E. SLEIGHTER and
FRED M. ERNSBERGER
Chisholm and Spencer
ATTORNEYS United States Patent Office 3,287,200
Patented Nov. 22, 1966

3,287,200
METHOD OF STRENGTHENING GLASS BY ION EXCHANGE AND ARTICLES THEREFROM
Albert R. Hess, Pittsburgh, George E. Sleighter, Natrona Heights, and Fred M. Ernsberger, Pittsburgh, Pa., assignors to Pittsburgh Plate Glass Company, Pittsburgh, Pa., a corporation of Pennsylvania
Filed Oct. 4, 1962, Ser. No. 228,255
6 Claims. (Cl. 161—1)

This invention is directed to improved glass articles and a method of producing such articles. More specifically the present invention is directed to improving the strength properties of glass articles by creating high compressive stresses in a thickness zone adjacent the surface of the glass article by successive treatment.

According to the present invention, increases in strength and related properties, e.g., impact resistance, breaking stress, penetration resistance, etc., are secured in glass articles, particularly lime-soda-silica flat glass articles such as spandrels, windshields, and other glass sheets suitable for use as viewing or like glass closures or partitions for buildings or transportation compartments, by first creating a compressive stress in a thickness zone extending inwardly from the surface of the glass, for example, by thermally tempering the glass, and then increasing the maximum compressive stress in said zone by contacting the glass with a salt of an alkali metal which alkali metal has a larger atomic diameter than an alkali metal in the surface of the glass. In the case of thermally tempered lime-soda-silica glass, the increase in maximum compressive stress in the zone adjacent the surface of the glass can be obtained by contacting the glass with a potassium salt or a mixture of potassium salts at elevated temperatures, viz., at temperatures preferably above about 600° F. but below the strain point of the glass, for various time periods ranging from several minutes or even less to several days or even longer.

Details of the invention are further described with respect to the contacting of a thermally tempered lime-soda-silica glass with a potassium salt, but the invention is not limited to this example of successive glass strengthening treatments. The contacting operation is conveniently effected after the production of the tempered glass article has taken place, viz., after the glass has been shaped into the desired article form and tempered. Advantageously the potassium salt employed to contact the glass surface comprises potassium nitrate, and the contact or at least a portion thereof conveniently takes place by immersing the tempered glass into a molten potassium nitrate bath.

To some extent at least, the contacting operation involves an exchange wherein potassium from the potassium salt is introduced into the glass surface apparently being exchanged for sodium present in the exterior portions of the glass article. It is believed that this is an ion exchange phenomenon, wherein potassium ions are exchanged for sodium ions.

As a consequence of this potassium treatment a compressive stress is established in the glass not only at the outermost surfaces of the glass article, but also extending from the surface for a finite thickness inwardly towards the center of the treated glass article. This compressive stress due to potassium treatment is generally of a higher magnitude than the compressive stress of the thermally tempered glass article prior to potassium treatment, but of lesser thickness than the compressive layer due to thermal tempering.

In the drawing, a schematic crosssection of a glass article treated in accordance with the present invention is shown in greatly exaggerated fashion for purposes of illustration. The degree of compressive stress is represented by the density of the section lines. The surfaces are shown to be in the highest state of compression as produced by the ion exchange treatment. Inward of the surface compression layer there is illustrated a layer of lesser compressive stress as induced by a prior strengthening treatment. The central region of the glass article is shown in a state of tension.

The outer potassium surface compressive stress layer is at least 1 micron thick per treated surface, and is usually less than 40 microns thick per treated surface. Usually the surface compressive stress layer ranges from 1 to about 200 microns thick per treated surface. Beneath and substantially contiguous with the outer potassium surface compressive stress layer there is an underlying "reserve" compressive stress layer due to thermal tempering. This reserve compressive stress layer is thicker than the said surface compressive stress layer, and the reserve compressive stress layer can even extend for a thickness per thermally tempered surface of up to one-quarter of the total thickness of the glass article. Usually, however, the reserve compressive stress layer per thermally tempered surface is at least 100 microns thick. For soda-lime-silica glass which is first thermally tempered and then treated with an alkali metal salt of large atomic diameter, the reserve compressive stress layer (per thermally tempered surface) extends from the surface immediately underlying the surface compressive stress layer inwardly toward the center of the glass article for a distance preferably equal to from 15 to 23 perecnt of the entire thickness of the glass article. Thus, the potassium treated, thermally tempered soda-silica glass articles of this invention not only have a higher initial breaking stress at the outermost surface(s), but also the extra advantage of a substantially contiguous tempered reserve breaking stress underlying the potassium treated outermost surfaces. While the central region of the glass sheet is under tension, the magnitude of the maximum central (interior) tensile stress, in pounds per square inch, is substantially less than the maximum compressive stress, also measured in pounds per square inch, at the outer surface of the potassium treated, thermally tempered glass article.

The tensile stress in the central interior region(s) is largely due to the thermal tempering, and the maximum tensile stress is well below the maximum compressive stress of the outermost potassium exchanged surface(s).

The maximum center tensile stress of the potassium treated, thermally tempered articles rarely exceeds 6000 millimicrons per inch (12,780 pounds per square inch), and seldom exceeds 4000 millimicrons per inch (8520 pounds per square inch). The optical rating of tensile stress expressed as millimicrons per inch can be converted readily to mechanical pounds per square inch stress units by multiplying by the stress-optical coefficient which is 2.13 for most conventional plate and sheet glass.

For thermally tempered glass articles having a maximum center tensile stress of 3200 to 3400 millimicrons per inch before potassium treatment, the tensile stress after potassium treatment usually does not exceed 2800 millimicrons per inch after immersion in a molten potassium nitrate treating bath at temperatures of 800° to 900° F. for potassium salt contact treating periods ranging from 15 to 60 minutes. For a given immersion contact period the maximum center tensile stress of the potassium treated, thermally tempered articles is generally lower at higher treating temperatures. For example, a thermally tempered soda-silica polished glass plate 0.250 inch thick having a maximum center tension (tensile stress) of approximately 3250 millimicrons per inch before potassium treatment possessed a maximum tensile stress of about 1000 millimicrons per inch after immersion in a molten potassium nitrate bath at 900° F. for sixty minutes. On the other hand, a thermally tempered polished glass plate of identical glass composition and thickness and having a maximum center tension of about 3400 millimicrons per inch before potassium treatment possessed a maximum center tension of about 2350 millimicrons per inch after potassium treatment at 800° F. for the same period of time (60 minutes). Yet the maximum surface compressive stress of both potassium treated plates was at least 40,000 pounds per square inch.

For thermally tempered glass articles having a maximum center tensile stress of 6000 to 6200 millimicrons per inch before potassium treatment, the maximum tensile stress after potassium treatment usually does not exceed 4500 millimicrons per inch after potassium treatment at 800°–900° F. for 15 minutes to 60 minutes. For example, a thermally tempered lime-soda-silica polished glass plate 0.250 inch thick and having a maximum tensile stress of approximately 6200 millimicrons per inch before potassium treatment possessed a maximum center tensile stress of about 1250 millimicrons per inch after potassium treatment at 900° F. for sixty minutes. On the other hand, a thermally tempered polished glass plate of the same glass composition, thickness and center tensile stress possessed a center tensile stress of approximately 3500 millimicrons per inch after potassium treatment at 800° F. for sixty minutes. Yet the maximum surface compressive stress of both potassium treated plates was at least 40,000 pounds per square inch.

The ratio of maximum surface compressive stress in the outermost potassium treated region(s) to maximum tensile stress in the central interior region(s) is at least 3 to 1 for the glass articles of this invention. Preferably this ratio is at least 7 to 1. However, the said ratio can be as high as 100 to 1 and even higher.

While the present invention will be illustrated hereinafter by discussion primarily relating to monolithic glass sheets, it should be realized that the basic effect of practice of the present invention is to increase substantially the scope of utility of glass to include its use where high strength properties and surface compression properties are advantageous in a myriad of fabricated articles of commerce. Hence, the value of the present invention extends not only to windshields but also to other glass articles such as those used in the construction field and all of the fields where materials are required to possess high strength properties, e.g., spandrels, windows, etc.

The invention is applicable to a wide range of alkali metal oxide-containing glasses. In such glasses $SiO_2$, $B_2O_3$ and/or $Al_2O_3$ may be the principal network formers and various alkaline earth metal oxides may be present as fluxes to aid in the melting of the glasses. For example, silicate glasses containing in excess of 40 percent by weight of $SiO_2$, 0 to 15 percent by weight of $B_2O_3$, 0 to 35 percent by weight of $Al_2O_3$, 0 to 25 percent by weight of CaO, MgO, SrO, BaO, PbO and/or ZnO and combinations thereof, 0 to 10 percent $TiO_2$, 0 to 10 percent $K_2O$ and 2 to 20 percent by weight of sodium oxide and/or lithium oxide can be employed in the practice of the invention.

The articles of the present invention offer dramatic improvement in breaking strength and impact resistance when compared to conventional glass articles whether annealed or thermally tempered. The articles of this invention can be produced from window and plate glass compositions having an initial sodium to potassium weight ratio (prior to treatment) in excess of 1 to 1, and preferably in excess of 5 to 1, for example, such glasses as soda-lime-silica glass. Such glasses usually have the following composition:

| | Percent by weight |
|---|---|
| $Na_2O$ | 10 to 15 |
| $K_2O$ | 0 to 5 |
| CaO | 5 to 15 |
| $SiO_2$ | 65 to 75 |
| MgO | 0 to 10 |
| $B_2O_3$ | 0 to 5 |

A typical soda-lime-silica glass suitable for use in accordance with this invention has the following composition:

| | Percent by weight |
|---|---|
| $SiO_2$ | 71.38 (usual variation 71 to 74) |
| $Na_2O$ | 12.76 (usual variation 12 to 14) |
| $K_2O$ | 0.03 (usual variation 0 to 1) |
| CaO | 9.67 (usual variation 8 to 12) |
| MgO | 4.33 (usual variation 2 to 5) |
| $Na_2SO_4$ | 0.75 (usual variation 0.1 to 1.0) |
| $Fe_2O_3$ | 0.15 (usual variation 0.1 to 1.0) |
| $Al_2O_3$ | 0.81 (usual variation 0.1 to 1.0) |

As shown by the above table, these glass compositions usually have a large excess of sodium over potassium. The weight ratio of concentration of sodium to potassium in such soda-lime-silica glass compositions generally ranges from about 25 to 1 to upwards of 150 to 1 and even higher since some soda-lime-silica glass compositions contain only trace amounts of potassium or no potassium.

After potassium treating thermally tempered soda-lime-silica glass according to the present invention, the chemical nature of the alkali oxide constituents of the outer surface of the glass article is altered radically. That is to say that at the outermost surface of the glass the sodium is essentially replaced by potassium. Yet at the central interior regions of the glass article the sodium content remains substantially unchanged by the treatment. Therefore, at the outer surface(s) of the glass article, there exists a high potassium to sodium weight ratio, whereas in the central interior region(s) there exists a high weight ratio of sodium to potassium.

The region of maximum potassium concentration exists in a layer which is parallel to the surface of the glass and which extends for about 0.5 to 1.0 micron in from the surface of the glass. The potassium concentration tapers off gradually in any layer parallel to the surface of the glass as the distance of that layer from the surface of the glass is greater, with the potassium concentration ultimately being substantially the same as in the untreated glass in a layer remote from the surface of the glass, i.e., 6 to 10 microns from the surface of the glass.

The thermal tempering of the glass can be by conventional methods. The thermal temperaing is conducted by raising the glass to a uniform temperature above the strain point of the glass, and then rapidly cooling the surfaces of the glass to establish a temperature differential (thermal gradient) between the surfaces and mid-plane of the glass so that as the mid-plane of the glass cools through the strain point the surface temperature is from 250° to 300° F., and more preferably 265° to 285° F., lower than the mid-plane glass temperature. The exact temperatures employed as well as heating and cooling rates and temperature differentials employed can be varied depending upon glass composition, glass thickness, and desired magnitude of temper to be incorporated into the glass. However, for most soda-lime-silica plate and sheet glass compositions, satisfactory thermal tempering can be conducted by raising the glass to a uniform temperature of from 1150° to 1250° F. in a period of from 3 to 6 minutes followed by rapid cooling, i.e., quenching of the glass surfaces in air for from 20 to 30 seconds. The quenching is conveniently conducted by air nozzles directed in a uniform coverage pattern at the exterior surfaces of the glass to uniformly cool all exterior surfaces yet maintain the desired thermal gradient between the said surfaces and the mid-plane of the glass article being tempered. Compressed air is usually employed for rapid cooling, and the thermal tempering cycle, inclusive of heating and cooling periods, generally takes about six minutes. After quenching the glass is generally allowed to further cool to ambient room temperature although this is not mandatory.

The thermally tempered glass is then potassium treated. Prior to subjecting the thermally tempered glass to potassium treatment, the glass is preferably preheated. This preheating is conducted to raise the glass temperature to a temperature ranging from 0° to 300° F. below that at which the potassium salt treatment is to be conducted. When the potassium treating salt consists essentially or entirely of potassium nitrate, the thermally tempered glass is preferably preheated to at least the melting point of potassium nitrate, viz., approximately 642° F. For potassium salt treating (contact) temperatures of from 750° to 950° F., the preheating is preferably conducted at temperatures ranging from about 700° to 800° F. for time periods ranging from about 5 to 15 minutes.

While preheating the thermally tempered glass prior to potassium treatment is preferred, this is not mandatory. In fact, the glass can be immersed while "cold," viz., at ambient temperatures (65° to 75° F.), into a molten potassium nitrate bath. However, in such cases the volume of the molten potassium nitrate salt should be great to prevent undue chilling of the bath by the glass. The volume of molten salt should be large enough to warm the glass without significantly dropping the temperature of the salt bath. Usually the heat content of the bath of molten alkali metal salt should be from about 10 to 100 times the number of British thermal units (B.t.u.) required to raise the temperature of the glass (at least at the surfaces) to the salt bath temperature. Also the molten salt bath should be agitated to allow movement of the molten salt thus enabling more efficient heat transfer conditions to prevail in the treating bath, and to reduce the concentration of sodium at the surface(s) of the bath contacting the glass surface(s). In addition, when the preheating step is omitted, it is advisable to provide the molten potassium salt bath with a temperature control device(s) to insure the maintenance of the bath temperature at that at which potassium treatment is to be conducted. The main purpose of these precautions when preheating is omitted is to avoid prolonged periods of "freezing" the potassium nitrate salt at the relatively cold glass surfaces after immersion, and to shorten the contact period required to attain the desired amount of potassium exchange, thus securing a more efficient potassium exchange and allowing a greater number of glass articles to be potassium treated by the treating apparatus over a given period of time. Even in view of the above noted "efficiency" precautions for a "no-preheating" technique, it is usually preferable to preheat the thermally tempered glass prior to potassium treatment.

After preheating, the thermally tempered glass is contacted with a potassium salt or mixture of potassium salts at elevated temperatures for various contact treatment periods. In the practice of this invention the potassium salt is usually contacted with the glass article while the potassium salt is maintained in molten condition. The equilibrium temperature of reaction is generally maintained at a temperature above 700° F. to insure as rapid a treatment cycle as possible thus enabling more articles to be produced in any given period of time.

As used herein the terms "equilibrium temperature of reaction," "contact temperature," etc., are employed to denote the temperature at which the potassium exchange is conducted. Conveniently this temperature is arrived at by (1) preheating and maintaining the potassium salt at a temperature preferably at or above 750° F., and (2) preheating the thermally tempered glass to a temperature preferably above 700° F. prior to contact of the thermally tempered glass with the potassium salt, viz., preheating the thermally tempered glass to a temperature approximating or equalling that at which the treating salt is maintained.

When an immersion contacting technique is used, the temperature of the surfaces of the tempered glass sheets being treated is generally correlated to the temperature at which the potassium salt treating bath is maintained. Hence, it is generally preferable to preheat the surfaces of the tempered glass sheets to be treated to a temperature approximating that at which the molten potassium salt bath is maintained prior to contacting the tempered glass sheets with the treating bath. However, it will be realized that the tempered glass can be preheated to a higher temperature than that at which the potassium salt bath is maintained as long as the temperature is not so high that all of the thermal tempering induced compressive stress is removed by relaxation. The converse is also true. That is to say, the potassium salt bath can be maintained at a temperature below the desired equilibrium reaction temperature as long as the glass is heated to a sufficient temperature to provide the desired "composite" or "interfacial" reaction temperature. Conversely the glass temperture can be and frequently is below the potassium salt treating temperature as long as the potassium salt bath is heated and maintained at a sufficiently high temperature to insure the desired ambient reaction temperature.

The potassium exchange treatment can be conducted at temperatures ranging from about 400° to 1400° F., depending upon the strain point of the glass and the particular potassium salt or salt mixture employed, for contact treating periods ranging from several minutes or even less to several days or even longer with the lower temperatures coinciding with the longer treatment periods and vice versa. Usually, however, the potassium exchange is performed at temperatures ranging from about 600° F. to about 1000° F. for time periods ranging from about 5 minutes to about 48 hours. Preferably the potassium treatment is carried out at temperatures ranging from about 750° to about 900° F. for time periods ranging from about 15 minutes to about 24 hours. When the potassium treatment is conducted in whole or in part at temperatures above the strain point of the glass being treated, the period of contact at these temperatures is far shorter than contact periods at the lower temperatures. At temperatures substantially below 400° F. the effect of potassium treatment is much slower with the result that production of glass articles herein contemplated is difficult to achieve within periods of time which are commercially practicable. At temperatures substantially above 1400° F. the glass tends to deform and thermally relax the potassium exchange induced surface compressive stresses. Also there may occur in the glass a rearrangement or migration of the potassium and sodium, which rearrangement or migration results in reduced surface strength. Moreover, the stability of the potassium treating salt(s) bath is more difficult to maintain thus causing safety and process control problems.

After potassium treatment, the glass should be cooled, preferably below 300° F. to 500° F., rapidly and in any event before the compressive stress imparted to the glass surface(s) during potassium treatment is materially reduced. However, cooling should not be carried out so rapidly as to break the potassium treated, thermally tempered glass due to thermal shock.

The nature of the potassium salt which is employed to treat the glass articles is important in that a potassium salt must be used which can be employed at the elevated temperatures set forth herein, without objectionable decomposition of the potassium salt occurring. The potassium salt of choice is potassium nitrate.

However, it is within the purview of this invention to employ potassium salts other than potassium nitrate, e.g., potassium chloride, potassium sulfate, etc., either in place of or in admixture with potassium nitrate or one another. Moreover, the potassium treating salt(s) can be molten or solid at the contact temperature. When a mixed potassium salt bath is employed, such as a mixture of potassium nitrate and potassium chloride, it is preferable to employ a predominating mole percent of potassium nitrate. For example, a mixed potassium salt treating bath suitable for use in the practice of the present invention is one having about 70 mole percent potassium nitrate and 30 mole percent potassium chloride. However, the advantages attendant to the method of the present invention can be secured using a potassium nitrate-potassium chloride treating bath having a potassium nitrate mole percent ranging from about 50 percent to 100 percent.

In the production of the articles of this invention over extended periods of time, when a plurality of glass articles are successively immersed in the molten potassium salt bath, sodium from the glass surface gradually accumulates in the bath from day to day or from week to week. For example, in a typical instance it was noted that seriatim dips of glass plates resulted in an increase of sodium in the potassium nitrate bath from 0.073 percent to 0.095 percent by weight.

As the sodium content increases, the degree of compressive stress in the glass surface for a given period of treatment time falls causing a corresponding reduction in glass strength. Thus, unless proper precautions are observed, glass articles which are dipped in a late stage of a campaign are not as strong as those dipped in the early stage thereof because of sodium accumulation in the potassium salt treating bath.

In general, the sodium content of the bath is held below 10 percent by weight, and preferably below 5 percent by weight, based upon the combined weight of sodium and potassium in the bath. At the onset and during the early stage(s) of any given campaign, the sodium content is generally below 2 percent by weight and rarely exceeds 1 percent by weight. Most preferably the sodium content ranges downwardly from 1 per cent by weight to a value approaching and even reaching 0 percent by weight.

The sodium content of the dipping bath should not be permitted to vary more than 5, and preferably less than 2 percent by weight (based upon the total combined weight of sodium and potassium in the molten bath) from the early (low sodium content) stage of dipping to the later (higher sodium content) stage thereof even though pluralities of glass articles are dipped over a period of 1 to 20 weeks. This control can be achieved in several ways. For example, the dipped article may be withdrawn rapidly and allowed to drain outside the bath so that the drippings (which can contain sodium) are not returned to the bath. Moreover, in this case the period of immersion can be held to a minimum so that most of the sodium exchange takes place after the glass is withdrawn from the bath. In addition, the bath composition can be adjusted by addition of potassium salt in amounts sufficient to replace consumed or withdrawn potassium. Also portions of the bath may be withdrawn and purified.

While the foregoing discussion relating to the potassium treating operation was in terms of an immersion contacting technique, the contacting operation can be effected conveniently by some means other than immersion. For example, the potassium salt can be deposited readily on the tempered glass surface prior to raising the temperature of both the glass and the potassium salt to the elevated temperatures required for treating. Or the potassium salt can be deposited from above by flowing it onto the outer surface of the glass while both the glass and potassium salt are maintained at treatment temperatures.

It is also possible to employ a contacting procedure which involves a combination of immersion and non-immersion procedures with the former occurring prior to the latter. In such a procedure the immersion ("in tank") contact can be at very high temperatures, for example, 950° to 1050° F. for an extremely short period of time, for example, two minutes or less, followed by non-immersion ("out of tank") contact at lower temperatures, for example, 750° F. to 900° F., for longer periods of time. The article is then cooled. Other variations in techniques of achieving contact of the glass article with the potassium treating salt will be apparent to those skilled in the art once the benefit of applicants' invention has become known.

While the technique of contacting the thermally tempered glass with the selected potassium treating salt, or salt mixture, can be varied, the potassium exchange (potassium diffusion) is conducted into a sufficient depth of the outer thermally tempered glass surface(s) to insure a resulting potassium to sodium ratio after treatment such that the potassium exchange induced surface ratio concentration of potassium to sodium is in excess of 1 to 1 for a surface depth of at least about 1 micron and preferably even deeper.

That is to say that in order to secure the utmost benefits of the strength characteristics which can be imparted to the improved glass articles of the present invention, it is necessary to conduct the potassium exchange so that there is a depth penetration of potassium for at least a finite thickness towards the mid-plane of the glass article. Thus, the increase in strength is sufficiently deep on a penetration level so that subsequent abrasive treatments, such as those involved by handling the glass or in other fabricating operations to which the treated glass sheet(s) may be later subjected, will not cause substantial loss of the strength characteristics imparted by the potassium exchange induced treatment.

The benefits and advantages attendant to the method and articles of the present invention are generally applicable to glass articles regardless of their thickness. Thus, for example, substantial increases in strength are secured in glass articles which are of a thickness of about 0.25 inch and greater. However, thinner, e.g., 0.06 inch, or thicker glass articles, e.g., 0.5 inch, can also be treated with an attendant increase in strength of these glass articles. Therefore, the present invention includes glass articles irrespective of their thickness. Hence, the present invention is adaptable to increasing the surface strength characteristics of thin and thick glass articles, viz., glass articles having thicknesses of the order ranging from about 0.09 inch to ¼ inch all the way up to extremely thick glass articles such as structural glass articles, e.g., glass doors.

While the preceding discussion has related to potassium treating the entire surface of all of the exterior surfaces of monolithic glass articles, it should be noted that only a portion of any one or more of the top, bottom, and outer edge peripheral surfaces of flat or curved thermally tempered glass plates or other articles can be potassium treated within the realm of this invention. Moreover, this invention includes any and all such potassium treated thermally tempered glass articles whether large or small. Of course, the greatest measure of strength benefits of the present invention are provided when the entire surface of the top, bottom and outer edge peripheral surfaces of the thermally tempered glass articles are potassium treated. In addition, the improved glass articles of this invention can be laminated using conventional glass laminating procedures.

The following examples serve to illustrate the invention in greater detail. However, it should be understood that the invention in its broadest aspects is not necessarily limited to the particular materials, thicknesses, and process conditions set forth below in the examples.

*Example I*

Component: Composition (percent by weight)
$SiO_2$ ---------------------------------- 71.65
$Na_2O$ ---------------------------------- 13.20
$K_2O$ ----------------------------------- 0.03
$CaO$ ----------------------------------- 11.83
$MgO$ ----------------------------------- 2.40
$Al_2O_3$ -------------------------------- 0.20
$Na_2SO_4$ ------------------------------- 0.57
$Fe_2O_3$ -------------------------------- 0.117

Twenty-four 4 inch by 4 inch by 0.25 inch polished glass plates of the composition listed above were provided. Eighteen of these plates (Samples 1–18) were thermally tempered. The thermal tempering was performed by rapidly raising the glass to a temperature of from 1150° F. to 1250° F. (mean peak temperature of 1200° F.) in a period of from 3.5 to 5.5 minutes followed by rapid cooling, i.e., quenching for from 20 to 30 seconds with compressed air. The air prior to compression was at room temperature whereas after compression the air temperature at the time of quenching ranged from 90° F. to 100° F. After quenching, these samples were then allowed to further cool to room temperature. The thermal tempering cycle averaged approximately six minutes for the eighteen samples.

Six of the thus thermally tempered samples (Samples 1 to 6) were then preheated by insertion into a heating oven, maintained at a temperature of 750° F., for a ten minute preheating period.

The tempered preheated samples were then removed from the oven and placed in a stainless steel carrying rack. The rack containing the samples was then immersed into a stainless steel cylindrical tank of 5 inch diameter and 7 inch height. The tank contained approximately five pounds of molten potassium nitrate salt at a height level of approximately 4.5 inches (prior to immersion of the samples). The potassium nitrate salt had been preheated to molten state and maintained at a temperature of 750° F. prior to immersion of the tempered glass samples. All samples (1–6) were completely immersed in the molten potassium nitrate.

The potassium treatment was conducted for a period of 24 hours, after which the treated samples were removed from the treating bath and rapidly cooled to a temperature below 300° F. The samples were then allowed to cool to room temperature.

Another set of six thermally tempered samples (Samples 7 to 12) were not potassium treated, but instead were heated in an oxen at 750° F. for 24 hours.

Thermally tempered samples 13 to 18 were neither subjected to potassium treatment, nor the heating to which Samples 7–12 were subjected.

Samples 19 to 24 were not subjected to any tempering, potassium treatment, or heat treatment (as in Samples 7–12), and were merely conventionally annealed glass plates.

The center tension (optical tensile stress), and breaking stress (calculated from observed concentric ring load strengths according to the formula, $$\text{Tensile stress (p.s.i.)} = 0.463 W/t^2$$

where $W$=load (pounds) and $t$=thickness (inches)) were then noted for Samples 1–24. This data is reproduced in Table 1 below.

TABLE 1

| Sample | Optical Center Tension Before Potassium Treatment (millimicrons/inch) | Optical Center Tension After Potassium Treatment (millimicrons/inch) | Average Breaking Stress (pounds/inch²) |
|---|---|---|---|
| 1 | 3,300 | 1,692 | |
| 2 | 3,380 | 1,700 | |
| 3 | 3,234 | 1,670 | 43,167 |
| 4 | 3,300 | 1,680 | |
| 5 | 3,298 | 1,690 | |
| 6 | 3,320 | 1,675 | |
| | Center Tension (mμ/in.) Before Heating | Center Tension (mμ/in.) After Heating | |
| 7 | 2,281 | 1,680 | |
| 8 | 2,761 | 1,622 | |
| 9 | 2,733 | 1,444 | 18,971 |
| 10 | 2,642 | 1,539 | |
| 11 | 2,735 | 1,545 | |
| 12 | 2,711 | 1,544 | |
| | Center Tension (mμ/in.) | | |
| 13 | 2,698 | | |
| 14 | 2,679 | | |
| 15 | 2,670 | | 22,452 |
| 16 | 2,695 | | |
| 17 | 2,782 | | |
| 18 | 2,744 | | |
| | Average Center Tension (mμ/in.) | | |
| 19 | | | |
| 20 | | | |
| 21 | That of conventionally annealed glass, viz., of the order of 50 mμ/in. | | 8,500 |
| 22 | | | |
| 23 | | | |
| 24 | | | |

As noted from Table 1 above, Samples 1–6, prepared in accordance with this invention, possessed superior strength as compared with: glass which had been thermally tempered only (Samples 13–18); glass which had been thermally tempered and heated as in Samples 1–6, but not potassium treated (Samples 7–12); and conventional annealed glass (Samples 19–24).

*Example II*

Sixty 4 inch by 4 inch by 0.25 inch polished glass plates of the composition listed above in Example I were provided.

Thirty of these plates were thermally tempered as in Example I to a center tension of 3200 millimicrons per inch. Twenty-seven of these plates were then preheated for 10 minutes at 750° F., and then potassium treated in groups of threes, each group being subjected to total immersion in molten potassium nitrate salt for the time periods and at the potassium treatment temperatures noted in the Table 2.

The optical center tension and optical compressive stress of each plate was read after the respective potassium treatments noted. The values listed in Table 2 are the averages for each group of three.

The remaining three plates were not subjected to potassium treatment of any kind. These plates had an average center tension of 3200 millimicrons per inch, and an average breaking load strength of approximately 4000 pounds (concentric ring, slow load). The average load strength of all the potassium treated plates was superior to the average load strength of the untreated plates.

The second group of thirty plates were thermally tempered by heating at 1200° F. to 1220° F. on a gas hearth support bed (as disclosed in U.S. Patent No. 3,223,501) for 4 minutes followed by rapid air cooling using compressed air for a cooling period of 30 seconds using a plenum quenching pressure of 3 pounds per square inch at a heat withdrawal rate of 0.020 to 0.021 calories per second per square centimeter per degree centigrade. Each of these thirty samples was tempered to a center tension of approximately 6200 millimicrons per inch using a cooling nozzle to glass surface spacing arrangement of 0.044 inch (top surface) and 0.034 inch (bottom surface), respectively.

Twenty-seven of these plates were then preheated for 10 minutes at 750° F., and then potassium treated in groups of threes, each group being subjected to total immersion in molten potassium nitrate for the time periods and at the potassium treatment temperatures noted in Table 2.

The optical center tension and optical compressive stress of each plate was read after the respective potassium treatment noted. The values listed in Table 2 are the averages for each group of three.

The remaining three plates were not subjected to potassium treatment of any kind. These plates had an average center tension of 6200 millimicrons per inch, and an average breaking load strength of approximately 6000 pounds (concentric ring, slow load). The average load strength of all the potassium treated plates was superior to the average load strength of the untreated plates.

The optical rating of tensile stress expressed as m$\mu$ per inch can be converted readily to mechanical pounds per square inch stress units by multiplying by the stress-optical coefficient which is 2.13 for most conventional plate and sheet glass.

The surface compression (compressive stress) measurements were also determined optically, but by a different method.

Surface compression stress is measured with an instrument known as a differential surface refractometer since it measures a quantity proportional to the differential between refractive indices for light polarized parallel and perpendicular to the glass surface. The instrument consists essentially of an incandescent light bulb, a rectangular prism with a refractive index higher than that of the surface of the glass, and the viewing telescope. The lower face of the prism is placed in contact with the glass surface with a liquid of intermediate refractive index between. In the telescope, bright lines are seen and the distance between them is proportional to the surface stress. This distance is measured with a micrometer eyepiece previously calibrated in terms of approximately 4050 pounds per square inch per scale division for plate glass

TABLE 2

| Potassium Treating Conditions | 800° F. | | | 850° F. | | | 900° F. | | |
| --- | --- | --- | --- | --- | --- | --- | --- | --- | --- |
| | 15 min. | 30 min. | 60 min. | 15 min. | 30 min. | 60 min. | 15 min. | 30 min. | 6 min. |
| Optical Center Tension (tensile stress) After Thermal Tempering But Before Potassium Treatment (millimicrons per inch) | 3,200 | 3,200 | 3,200 | 3,200 | 3,200 | 3,200 | 3,200 | 3,200 | 3,200 |
| Average Optical Center Tension After Potassium Treatment (millimicrons per inch) | 2,825 | 2,575 | 2,350 | 2,225 | 2,035 | 1,750 | 1,550 | 1,375 | 990 |
| Average Before Potassium Treatment | 15,360 | 15,360 | 15,360 | 15,360 | 15,360 | 15,360 | 15,360 | 15,360 | 15,360 |
| Average Optical Compressive Stress After Potassium Treatment (pounds per square inch) | 32,400 | 32,400 | 44,550 | 40,549 | 48,600 | 54,675 | 40,549 | 48,600 | 48,600 |
| Optical Center Tension After Thermal Tempering But Before Potassium Treatment (millimicrons per inch) | 6,200 | 6,200 | 6,200 | 6,200 | 6,200 | 6,200 | 6,200 | 6,200 | 6,200 |
| Average Optical Center Tension After Potassium Treatment (millimicrons per inch) | 4,350 | 4,000 | 3,450 | 3,600 | 2,970 | 2,450 | 2,140 | 1,680 | 1,250 |
| Average Before Potassium Treatment | 29,760 | 29,760 | 29,760 | 29,760 | 29,760 | 29,760 | 29,760 | 29,760 | 29,760 |
| Average Optical Compressive Stress After Potassium Treatment (pounds per square inch) | 20,617 | 36,450 | 52,650 | 44,550 | 52,650 | 42,930 | 42,525 | 40,549 | 42,930 |

The average optical compressive stress (p.s.i.) values for the thermally tempered plates before potassium treatment were arrived at by multiplying the optical center tension values by 4.8.

The load strength tests referred to in Examples I and II were conducted using concentric ring loading on the four-inch square test plates. The outer ring had a diameter of 3 inches and the inner ring had a diameter of 1.5 inches. The load speed was 0.02 inch per minute, and the reported load strengths are the strengths (pounds) at which failure (glass breakage) occurred.

The center tension (tensile stress) measurements on all glass plates were determined by an optical method. The method employed is one usually used for rating the degree of anneal in annealed glass samples.

The method consists of a measure of the center tension stress obtained by viewing along the center plane of the glass plate being measured. A graduated quartz wedge (prism) is used to measure this stress optically, expressed in millimicrons of birefringence (often abbreviated as m$\mu$ per inch of per centimeter of viewing section. The quartz wedge can be used as an accessory on a Polarizing Microscope for viewing small samples or it can be adapted with separate lens, light source and polarizer for viewing through larger samples. It is not practical to view through more than 20 times the thickness of flat glass. With the use of prisms, it is possible to view across the corners of large flat plates. When measuring center tensile stress in curved plates, it is desirable to measure in a direction where the bow is at a minimum or reduce the viewing section until the bow is less than 10 percent of the glass thickness.

and 6000 pounds per square inch per scale division for sheet glass. The glass plates of Examples I and II were plate glass. By observing line separation on glass surfaces subjected to known mechanical stress or conventional thermally tempered surfaces usually only two lines are visible, one polarized perpendicular to and the other parallel to the plane of incidence of the light rays on the glass surface. The potassium salt treated glass surfaces usually exhibit multiple sets of lines, each representing the stress at a particular depth in the stress layer. These lines are usually seen as dispersed spectra due to chromatic variation of the critical angle between the prism and the glass surface. By means of an adjusting screw, the angle between the prism and the glass surfaces is adjusted to achromatize the sets of lines representing the stress condition at the surface of the ion exchange layer.

The alkali metal treated glass articles of this invention are characterized by the following features:

(A) High breaking stress and impact resistance;

(B) High tensile strength;

(C) The alkali metal treated portions of the major surfaces, edges, and sides of the glass article are in compression for a thickness of at least 1 micron (usually below 400 microns) with an underlying yet substantially contiguous reserve compressive stress zone which is less in magnitude of compressive stress yet of greater thickness than the alkali metal induced outermost compressive stress zone;

(D) A central interior thickness of the glass article being in tension with a maximum central tensile stress not substantially exceeding 13,000 pounds per square inch;

(E) A ratio of maximum surface compression to maximum centre tension of at least about 3 to 1;

(F) A concentration of an alkali metal in the exterior surface compressive stress zone as constituted by the exterior alkali metal treatment which alkali metal is different from and of larger atomic diameter than both an alkali metal in the underlying "reserve" compressive stress zone and an alkali metal in the central interior tensile stress zone, and usually said surface zone has a concentration of an alkali metal which is different from and of larger atomic diameter than both the preponderant alkali metal atom in the underlying zone and the preponderant alkali metal atom in the central interior zone;

(G) An alkali metal content in the exterior surface compressive zone as constituted by the exterior alkali metal treatment substantially higher than the content of the same alkali metal in the underlying "reserve" compressive stress zone and in the central interior tensile stress zone of the glass article;

(H) The outer surface weight ratio of the exterior alkali metal in the outermost portion of said outer surface compressive stress zone, as defined in paragraphs (F) and (G), to a different alkali metal in said zone is in excess of 5 to 1. This outer surface weight ratio persists for a thickness of about 2 microns or more but rarely exceeds 30 microns. Moreover, this ratio is usually at least 100 to 250 or more times the ratio of the same alkali metals in the central interior tensile stress zone;

(I) The difference between the maximum and minimum compressive stressses per unit thickness in the said exterior surface compressive stress zone is greater than that in the said underlying zone, viz., the slope of the compressive stress curve in the said surface zone, wherein than that in the said underlying reserve zone, wherein compressive stress (pounds per square inch) is plotted versus zone thickness.

One of the prime facets of the articles of the present invention resides in glass closures, which can be transparent (primarily viewing closures), translucent, and/or opaque. These glass closures can be in the form of monolithic sheets, e.g., architectural spandrels for buildings, rooms, etc. Architectural laminates for buildings and rooms can also be produced readily and are within the purview of this invention.

The present invention also encompasses thermally tempered articles having only a selected portion(s) of a respective surface(s) potassium treated, as well as potassium treatment of the entire surface of all surfaces of the thermally tempered article, respectively.

Moreover, this invention includes composite articles containing various combinations of types of potassium treated thermally tempered articles, such as composite insulation spandrels and like glass closures, whether comprising individual monolithic potassium treated thermally tempered glass, or laminates formed therefrom whether flat or curved. For example, this invention includes insulation spandrels (two or more potassium treated thermally tempered spandrels mounted in a common frame with air space(s) therebetween) having a decoratively printed or colored plastic sheet(s) located in the air space(s). In such a structure any one of the glass spandrel panels can be transparent, translucent or opaque, and colored or not colored. For example, the outer potassium treated thermally tempered spandrel can be transparent and the inner (facing towards the inside of the building) potassium treated thermally tempered spandrel can be opaque with the intermediately located decorative plastic sheet located in the air space therebetwen. Thus, the decorative sheet can be seen when viewing from the outside-in but not seen when viewing from the inside-out. Or a reverse arrangement can be adopted. These and other arrangements can be secured with laminates also.

While the production of the glass articles of this invention has been described hereinabove with regard to the use of high temperatures for fairly short potassium treatment periods, i.e., no longer than 24 hours; it should be realized that potassium treatment can be conducted at significantly lower temperatures over extended time periods. Although commercial production favors the short time-high temperature procedure as a matter of economics and convenience; the articles of the present invention can be produced at lower temperatures as long as the temperature is sufficiently high to allow some potassium exchange to take place, whether using molten or finely divided solid potassium salts to effect treatment. For example, where time is not a controlling factor the potassium treatment can be performed at temperatures ranging from about 400–700° F. over time periods ranging from about several days to several hours, with the longer time periods coinciding with the lower temperatures and vice versa.

Moreover, other monovalent or polyvalent alkali ion exchange surface compression inducing salts can be employed either in place of or serially administered in conjunction with a potassium salt treatment, either before or after the potassium salt treatment of the thermally tempered glass base (article) to induce compressive stress of greater magnitude than that of the thermally tempered surfaces.

For example, sodium or potassium treatment can be performed on thermally tempered lithium glasses.

Also instead of imposing the underlying compressive stress by thermal tempering, it can be provided by an alkali metal exchange treatment. Thereafter another alkali metal exchange treatment, using a salt of an alkali metal having a larger atomic diameter than that used to establish the underlying compressive stress, can be conducted to establish the surface compressive stress. For example, lithium glasses can first be sodium treated and thereafter potassium treated to produce a surface potassium treated, underlying sodium treated lithium glass article.

The present invention extends to a wide spectrum of usage, including, but not limited to, production of glass articles to be used for: glass closures; building materials; architectural applications; bottles, e.g., containers for liquids; drinking glasses; tableware, e.g., plates, cups and saucers; cooking ware; viewing closures such as window panes; laminated structures; glass insulation structures wherein a plurality of glass sheets are arranged in a spaced fashion with a layer of air serving as the insulation medium; television tubes; television safety-glass implosion and/or explosion shields; glass roofs or transparent domes in vehicles and buildings; experimental devices such as glass engine parts which must withstand a high compression; ceramic and siliceous articles used in the dental arts such as dentures and crown caps; ceramic mufflers for automobiles, airplanes, and other vehicles; etc.

Although the present invention has been described with respect to specific details of certain embodiments thereof, it is not intended that such details serve as limitations upon the scope and spirit of the present invention. The present invention in its broadest aspects is not necessarily limited to the specific compositions, temperatures, and treatment times specified in the foregoing examples.

What is claimed is:

1. A method of strengthening a glass article containing an alkali-metal which comprises tempering the glass to place a compression zone in the surface of the article and thereafter placing a higher compression in the surface of the article to a lesser depth than the depth of said compression zone by replacing the alkali-metal ions in said lesser depth of the compression zone by larger alkali-metal ions by contacting the glass with a source of larger alkali-metal ions while retaining the glass at a temperature below the strain point of the glass until the higher degree of compression is imparted to such lesser depth by said replacement, the ultimate strength of the article after said ion replacement being greater than that imparted by the initial tempering step.

2. The method of claim 1 wherein the compression zone originally placed in the glass article by tempering is placed therein by thermal tempering.

3. The method of claim 2 wherein the thermal tempering is achieved by air quenching.

4. The method of claim 1 wherein the compression zone originally placed in the glass article by tempering is placed therein by replacing the alkali-metal ions in said zone by larger alkali-metal ions by contacting the glass article with a source of said larger alkali-metal ions while retaining the glass at a temperature below the strain point of the glass until the zone is placed in compression by said replacement.

5. The method of claim 4 wherein the glass article originally contains lithium, said lithium being replaced by sodium in the original compression zone, and said sodium being replaced by potassium in said zone of lesser depth.

6. A glass article produced by the method of claim 1.

References Cited by the Examiner

UNITED STATES PATENTS

| | | | |
|---|---|---|---|
| 2,198,733 | 4/1940 | Leibig et al. | 65—30 X |
| 2,779,136 | 1/1957 | Hood et al. | 65—30 X |
| 3,107,196 | 10/1963 | Acloque | 65—115 |
| 3,218,220 | 10/1965 | Weber | 65—30 |

DONALL H. SYLVESTER, *Primary Examiner.*

G. R. MYERS, *Assistant Examiner.*